(12) United States Patent
Zantos

(10) Patent No.: US 6,476,856 B1
(45) Date of Patent: Nov. 5, 2002

(54) ORBIT CAMERA HOUSING

(75) Inventor: Robert L. Zantos, Santa Ana, CA (US)

(73) Assignee: WestCoast Performance Products USA, Inc., Anaheim, CA (US)

( * ) Notice: Subject to any disclaimer, the term of this patent is extended or adjusted under 35 U.S.C. 154(b) by 0 days.

(21) Appl. No.: 09/273,186

(22) Filed: Mar. 19, 1999

Related U.S. Application Data

(60) Provisional application No. 60/078,817, filed on Mar. 20, 1998, and provisional application No. 60/078,851, filed on Mar. 21, 1998.

(51) Int. Cl.[7] .................................................. H04N 7/18
(52) U.S. Cl. ........................ 348/151; 348/143; 348/151
(58) Field of Search ................................... 348/143–159

(56) References Cited

U.S. PATENT DOCUMENTS

| | | | |
|---|---|---|---|
| 4,225,881 A | * 9/1980 | Tovi | 348/151 |
| 4,833,534 A | * 5/1989 | Paff et al. | 348/151 |
| 4,901,146 A | * 2/1990 | Struhs et al. | 348/151 |
| 5,153,623 A | * 10/1992 | Bouvier | 348/151 |
| 5,394,184 A | * 2/1995 | Anderson et al. | 348/151 |
| 5,394,209 A | * 2/1995 | Stiepel et al. | 348/151 |
| 5,818,519 A | * 10/1998 | Wren | 348/151 |
| 5,852,754 A | * 12/1998 | Schneider | 348/151 |
| 6,268,882 B1 | * 7/2001 | Elberbaum | 348/151 |

OTHER PUBLICATIONS

Specification Sheet—V25 Armor Plate—Flush Mount, By Silent Witness Brochure—Experience Innovation, By Silent Witness.

* cited by examiner

*Primary Examiner*—Andy Rao
(74) *Attorney, Agent, or Firm*—Knobbe, Martens Olson & Bear, LLP.

(57) ABSTRACT

A camera housing permits installation of a surveillance camera on a wall or ceiling. The camera housing includes tamper resistant features to prevent disabling or vandalism of the camera. Because the camera housing mounts into a wall with a low profile, the camera housing may be installed at eye level to provide a more advantageous viewing angle of an area. For example, the camera housing may be mounted so that the camera is capturing images of a doorway at approximately eye level. This mounting level provides a clearer view of the subject. The camera housing may be positioned so the camera can obtain a view over a range of up to 360 degrees of pan and up to 180 degrees of tilt. The camera housing may also be colored using an anodizing process. The anodizing process provides for a durable color that resists scratching or wear. The color of the camera housing may be matched to the décor of the surface the housing is mounted on so the housing blends seamlessly with the décor.

34 Claims, 9 Drawing Sheets

ORBIT CAMERA HOUSING

This application claims the benefit of U.S. Provisional Patent Applications 60/078,817 and 60/078,851, both filed Mar. 20, 1998.

BACKGROUND

1. Field of the Invention

This invention relates to the field of camera housings. More specifically, the invention relates to a housing for mounting a surveillance camera to a surface.

2. Description of the Related Art

Surveillance cameras are widely used to enhance the security of a building, room, or other designated areas. Surveillance cameras are typically mounted high to provide a broad coverage area of the camera. One common installation location is to mount the camera on a bracket from the ceiling of a room. Although this provides a broad coverage area, the viewing angle may provide images that are inadequate for later use such as identification. Further, bracket installations of surveillance cameras are unable to provide coverage over a broad range of pan and tilt. The bracket itself is generally an impediment to proper camera orientation.

One goal of surveillance cameras is to deter crime. However, it is common for thieves or vandals to destroy cameras in order to prevent having the camera record their image. Because cameras are installed on a bracket, or within a glass dome, it is simple for the vandals to gain access to the camera. Such cameras are usually easily disabled by several blows from a blunt instrument or by cutting the electrical connection wires leading to the camera.

Another problem of existing surveillance camera systems is that the cameras are generally not aesthetically pleasing. Surveillance cameras and their associated housings may have visible wiring, present a bulky appearance, and not blend with the décor or a room. One may be deterred from installing a surveillance camera if the camera degrades the overall appearance of the room.

For externally mounted surveillance cameras or cameras mounted in industrial areas, the camera should also be protected from environmental hazards. If a camera has any exposed electronics, the chances of damaging the camera is increased. Even current camera housings which are not watertight expose the electronic components of a camera to potential damage due to inclement weather or other environmental hazards.

What is needed is a camera housing capable of being mounted anywhere within a room, including on the walls. The camera housing should permit the camera to cover a broad area. The housing should provide protection from the environment, vandalism, and other external elements, while simultaneously blending in with the décor of a room.

SUMMARY

The present invention is a camera housing that permits installation of a camera on a wall or ceiling. The camera housing includes tamper resistant features to prevent disabling or vandalism of the camera. Because the camera housing mounts into a wall with a low profile, the camera housing may be installed at eye level to provide a more advantageous viewing angle of a room. For example, the camera housing may be mounted so that the camera is capturing images of a doorway at approximately eye level. This mounting level provides a clearer view of the subject. The camera housing may be positioned so the camera can obtain a view over a range of up to 360 degrees of pan and up to 180 degrees of tilt.

The camera housing of the present invention may also be colored using an anodizing process. The anodizing process provides for a durable color that resists scratching or wear. The color of the camera housing may be matched to the decor of the surface the housing is mounted on so the housing blends seamlessly with the decor.

One embodiment of the invention is a camera housing comprising a first retaining ring and a second retaining ring. The second retaining ring is positioned in coordination with the first retaining ring to create a gap between the rings. A camera retaining body is positioned between the retaining rings and is adapted to enclose a camera. The camera retaining body is moveable over a range, but may be locked in a set position by decreasing the gap between the retaining rings. In one embodiment, the camera retaining body is adapted to enclose a surveillance camera and is moveable over a range of 360 degrees of pan and 90 degrees of tilt and is rotatable about its axis. The camera retaining body may also enclose cameras of differing sizes. A bolster plate may be mounted on one side of the surface to increase the mounting strength of the retaining rings. The retaining rings are connected together using a plurality of fasteners having anti-tampering features.

In another embodiment of the invention, a camera housing comprises a first mounting plate, a second mounting plate, a body, and a connection board. The body has a first section and a second section and is adapted to enclose a camera. The mounting plates act in cooperation to secure the body recessed in a surface. The connection board is adapted to host connections for the camera and is movably attached to the second section of the body to allow for movement of camera connections. The connection board allows for an increased range of motion of the camera body without the camera connections contacting the mounting surface.

Another embodiment of the invention is a method of mounting a camera housing within a surface including the steps of securing a first retaining ring to the surface, positioning a camera retaining body on the first retaining ring, and locking the camera retaining body into position by tightening a second retaining ring to the first retaining ring. The camera housing may be mounted at eye level on a wall. The camera body may be mounted in an electrical box or recessed in the surface.

Another embodiment of the invention is a camera housing comprising means for mounting a camera retaining body on a surface. The camera retaining body is adapted to enclose a camera and position the camera over a range. The camera housing also includes, means for locking the camera retaining body in a set position Another embodiment of the invention is a camera housing comprising a base, a protective dome, a locking ring, and a camera mounting stand. The locking ring secures the dome to the base by fitting over the dome and threading into the base. The camera mounting stand is adapted to receive a camera and can mount to the base in either a first mounting position or a second mounting position. The combination of mounting positions permits positioning of the camera over a range of 360 degrees of pan and 180 degrees of tilt.

BRIEF DESCRIPTION OF THE DRAWINGS

These and other features and advantages of the invention will become more apparent upon reading the following detailed description and upon reference to the accompanying drawings.

DETAILED DESCRIPTION

The camera housing of the present invention is designed to contain a surveillance camera and to be mounted within a surface such as a wall, ceiling, or floor. The camera housing provides environmental and physical protection for the camera. After the camera is inserted in the housing, the camera and housing can be positioned in an appropriate location to provide video coverage of important areas of an area.

Figure 1:
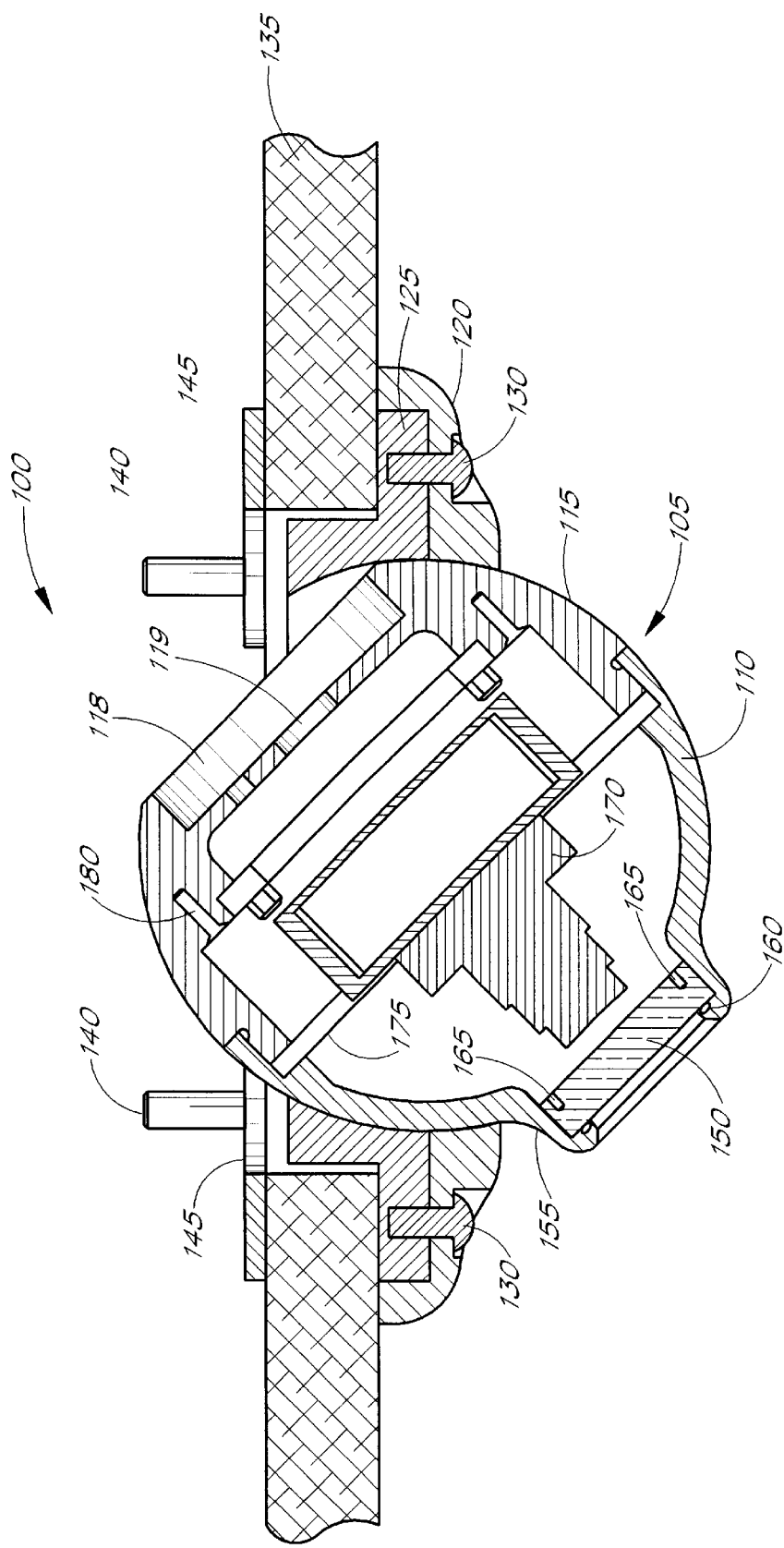
FIG. 1 is a cut-away plan view of a camera housing mounted within a surface according to the present invention.

FIG. 1 illustrates a cutaway view of a camera housing 100 according to the present invention. The camera housing 100 comprises a camera-retaining body 105, a retaining ring 120, and a mounting ring 125. The camera-retaining body 105 has a first section 110 and a second section 115. The first section 110 and the second section 115 combine to form a generally spherical-shaped, camera-retaining body 105. The interior of the camera-retaining body 105 is hollow and is adapted to hold a surveillance camera 170. The camera-retaining body 105 fits between the retaining ring 120 and the mounting ring 125. In one embodiment of the invention, the retaining ring 120, the mounting ring 125, and the camera-retaining body 105 are machined from aluminum. One type of material which may be used is Billet 2024, 6061, or 7075 aircraft grade aluminum. The camera housing 100 may also be made from other materials such as steel, iron, copper, or other metals. Of course, the camera housing 100 may be made from other material such as plastic, but doing so would decrease the overall strength and protection provided by the housing 100.

The mounting ring 125 is placed within a mounting surface 135. The mounting surface 135 may be a wall, a ceiling, a floor, or any other surface. The mounting ring 125 is designed to be placed into an opening in the mounting surface 135. The opening in the mounting surface 135 may be a hole cut within the mounting surface 135, and no additional mounting hardware would be required. However, a surface mount assembly (not shown) may be used if it is desired to not cut a hole in the mounting surface 135. Adapters may also be used to mount the camera housing 100 in an existing electrical box or other preexisting outlets.

Because the mounting ring 125 is adapted to fit within a hole in a mounting surface 135, the camera housing 100 of the present invention may be mounted in any location on its surface 135. This allows the camera housing 100 to be placed at the most strategic location in an area. For example, the camera housing may be mounted on a wall facing the entry doorway into a room. With this mounting, the camera would capture the facial image of anyone entering or leaving the room. By mounting the camera at eye level, a better image of each person would be captured as compared to the traditional ceiling mount.

The mounting ring 125 is secured to the mounting surface 135 by a plurality of mounting fasteners 140. The mounting fasteners 140 extend through the mounting ring 125 and through the mounting surface 135. The mounting fasteners 140 may be bolts, screws, or the like. One or more bolster plates 145 may be placed on the back side of the mounting surface 135. When the bolster plates 135 are used, the plurality of mounting fasteners 140 also extend through the bolster plates 145. The bolster plates 145 provide additional surface area contact on the rear surface of the mounting surface 135. The additional surface area contact provided by the bolster plates 145 increases the mounting strength of the camera housing 100.

Once the mounting ring 125 is secured to the mounting surface 135, the retaining ring 120 is secured to the mounting ring 125 by a plurality of fasteners 130. The fasteners 130 extend through the retaining ring 120 and into the mounting ring 125. The plurality of fasteners 130 may be screws, bolts, or other appropriate fasteners. In one embodiment of the invention, the plurality of fasteners 130 are tork screws. The tork screws may include antitampering features to prevent the camera housing 100 from being removed by unauthorized personnel. When positioned over the mounting ring 125, the retaining ring 125 precludes access to the mounting fasteners 140.

The first section 110 of the camera retaining body 105 includes a neck portion 155 which houses a lens cover 150. The lens cover 150 provides protection for the camera 170. The lens cover 150 is a transparent cover and may be resistant to breakage from external force. This allows the camera 170 to operate through the lens cover 150 while providing protection to the camera 170. The lens cover 150 may be constructed of acrylic, Lexan, safety glass, or other break-resistant transparent material. The lens cover 150 contains removal apertures 165 to assist in inserting and removing the lens cover into the neck 155 of the first section 110 of the camera housing 105. A gasket 160 may be inserted with the lens cover 150 to provide water-tight sealing.

The second section 115 of the camera housing 105 contains a bottom cutout 118. The bottom cutout 118 also contains an aperture 119. As will be described below, the bottom cutout 118 and the aperture 119 provides for the electrical connections to the camera 170. Because the bottom cutout 118 is located on the rear of the camera housing 105, the electrical connections are located within the mounting surface 135. This decreases the ability to vandalize or sabotage the camera.

The camera 170 is typically mounted on a camera board 175. The camera board 175 may be a printed circuit board or other mounting device for the camera. The camera board 175 is secured to the second section 115 of the camera retaining body 105 using a plurality of standoffs or adaptors 180. The use of standoffs or adaptors 180 allows for a variety of sizes and shapes of cameras 170 and camera boards 175 to be used within the camera-retaining body 105.

Figure 2:
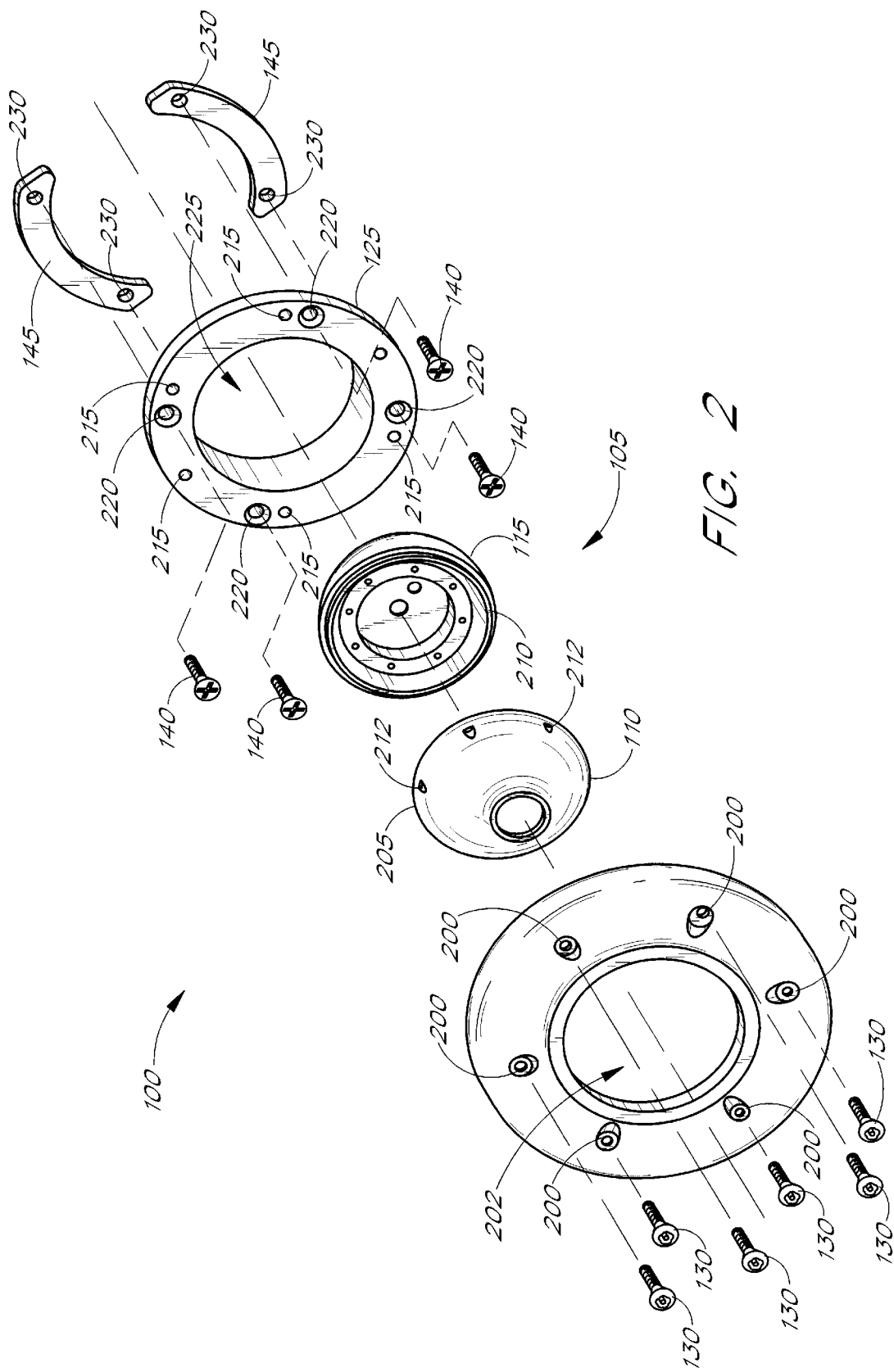
FIG. 2 is an exploded, perspective view of the camera housing according to FIG. 1.

FIG. 2 illustrates an exploded view of the camera housing 100. The camera retaining body 105 is positioned between the mounting ring 125 and the retaining ring 120. The first section 110 of the camera-retaining body 105 protrudes from an aperture 202 in the first section 120 of the camera-retaining body 105. The diameter of the first section 110 of the camera-retaining body 105 is such that only a portion of the first section 110 of the camera-retaining body 105 extends through the aperture 202. Likewise, the second section 115 of the camera-retaining body 105 protrudes through an aperture 225 in the mounting ring 125. When the first section 110 and the second section 115 of the camera-retaining body 105 are connected together, the camera-retaining body 105 may rotate within the apertures 202 and 225. The camera-retaining body may rotate over a range to provide a full 360° of pan and 90° of tilt. The camera-retaining body may also rotate about its axis to provide proper orientation of the video image.

After the camera-retaining body 105 is positioned between the retaining ring 120 and the mounting ring 125, and the proper orientation of the camera-retaining body 105 is obtained, the camera-retaining body 105 may be locked in position. When the retaining ring 120 is placed over the mounting ring 125, a slight gap is formed between the two rings. While this gap exists, the camera-retaining body 105 may freely rotate between the two rings 120 and 125 over the full range of pan and tilt. To lock the camera-retaining body 125 in place, the fasteners 130 are inserted through the apertures 200 in the retaining ring 120 and through the apertures 215 in the mounting ring 125. The fasteners 130 are then tightened to reduce the gap between the rings 120 and 125. When the size of the gap between the rings 120 and 125 is sufficiently reduced, pressure provided by the rings 120 and 125 locks the camera-retaining body 105 in a set position. To reposition the camera-retaining body 105 at a different angle, the fasteners 130 should be loosened to increase the size of the gap between the retaining rings 120 and 125. The camera-retaining body 105 may then be manually repositioned and then locked down by tightening the fasteners 130.

Figure 3A:
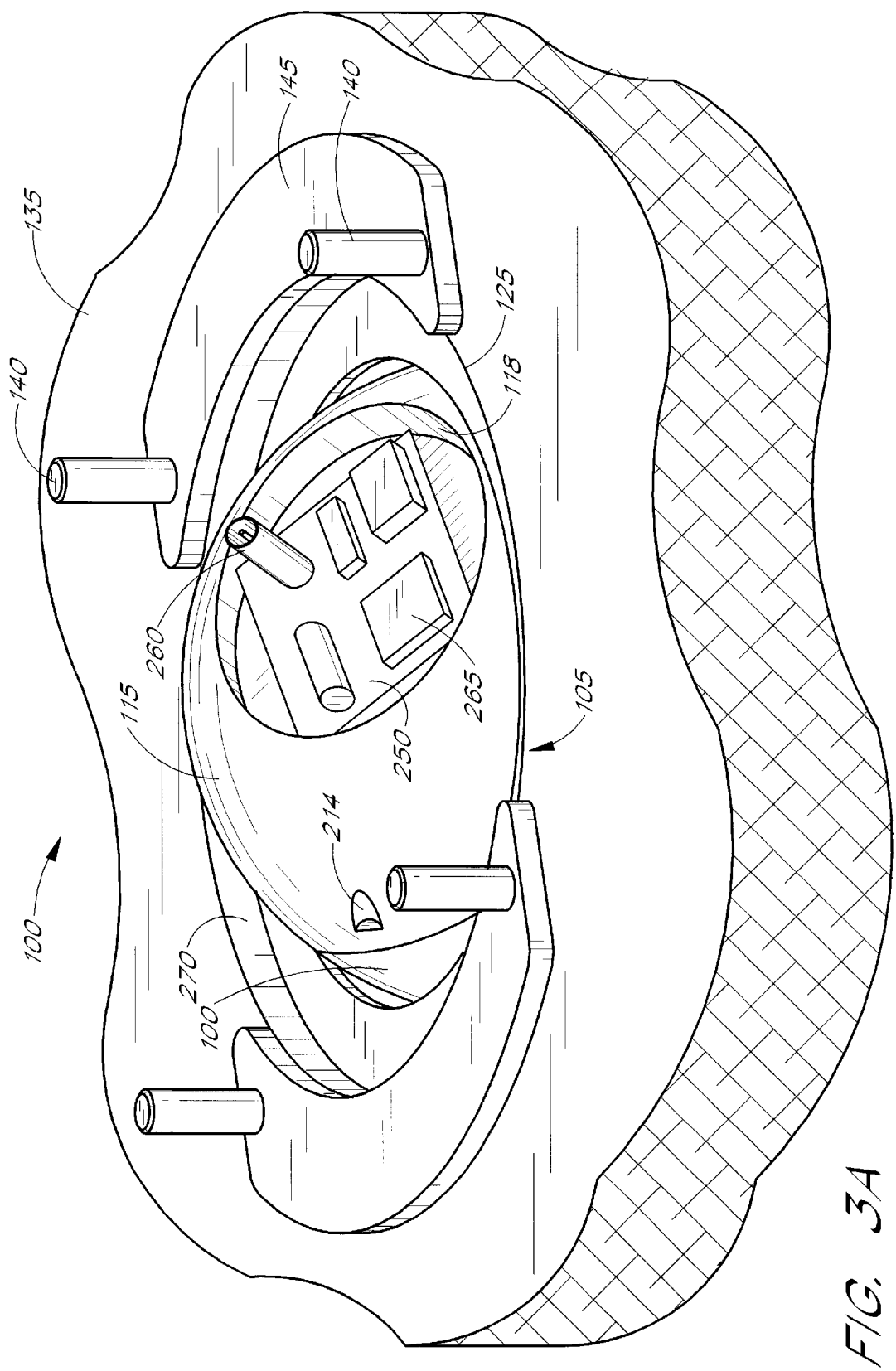
FIG. 3A illustrates a back view of the camera housing mounted within a surface according to the present invention.

The camera-retaining body 105 contains a flat surface 205 at the periphery of the first section 110. Likewise, the second section 115 contains a flat surface 210 at its periphery. The flat surfaces 205 and 210 combine to form one extended flat surface when the first section 110 and the second section 115 are secured together to form the camera-retaining body 105. This provides the generally spherical shape of the camera-retaining body 105 with a small, flat area along its circumference. By creating this flat area using the combined flat surfaces 205 and 210, the camera-retaining body 105 may freely rotate between the rings 120 and 125 within the apertures 202 and 225. Further, to assist in the assembly and disassembly of the camera-retaining body 105, the first section contains assembly grips 212 and the second section 115 contains assembly grips 214 (FIG. 3A). The assembly grips 212 and 214 are designed to mate with a special tool (not shown) which allows the user to rotate the first section 110 with respect to the second section 115. The tool allows the user to rotate the sections with increased torque. The assembly grips 212 and 214 allow the user to tighten the camera-retaining body 105 to a point where it would be difficult to loosen the two sections by hand. This increases the security of the surveillance camera 170 within the camera-retaining body 105.

Also seen in FIG. 2 are mounting apertures 220 within the mounting ring 125. The mounting fasteners 140 extend through the mounting apertures 220 to connect the mounting ring 125 to the mounting surface 135 (FIG. 1). The bolster plates 145 also contain mounting apertures 230 which the mounting fasteners 140 extend through. The mounting ring 125 is affixed to the mounting surface 135 by placing the mounting fasteners 140 through the mounting apertures 220 and 230.

FIG. 3A illustrates a top view of the camera housing 100 mounted within and extending through a mounting surface 135. Depending on the positioning of the camera-retaining body 105, portions of the second section 115 and portions of the first section 110 of the camera-retaining body 105 may extend through the mounting surface 135. The mounting ring 125 extends within an access aperture 270 in the mounting surface 135. As stated above, the bolster plates 145 may be included on the back side of the mounting surface 135 to increase the strength of the mounting. In the illustrated embodiment, a pair of bolster plates 145 are installed on the rear side of the mounting surface 135. The bolster plates 145 are secured by the mounting fasteners 140.

A circuit board 250 is placed within the bottom cutout 118 of the second section 115 of the camera-retaining body 105. The circuit board 250 may contain electrical connections for the camera 170, including a video connector 260 to connect the video cable to the camera 170 and connection circuitry 265. The circuit board 250 can be movably mounted within the bottom cutout 118 so the circuit board 250 may rotate within the bottom cutout 118. A retaining ring (not shown) may be used to secure the circuit board 250 within the bottom cutout 118. Of course, other known methods of movably securing the circuit board to the bottom cutout 118 may be used without departing from the spirit of the invention. The camera connector 260 is typically connected to a video cable which extends from the camera to a recorder. Because the camera-retaining body 105 may move within a range of 360° of pan and a full 90° of tilt, it is possible the camera connector 260 may impinge upon the access aperture 270 in the mounting surface 135. If the camera connector 260 were mounted in a stationary position, this would limit the range of movement of the camera-retaining body 105. In the present invention, the camera connector 260 is mounted on the circuit board 250 which may be rotated within the bottom cutout 118. If the camera-retaining body 105 is moved to a position which may cause the camera connector 260 to impinge on the access aperture 270, the circuit board 250 may simply be rotated until the camera connector 260 is in a position which does not interfere. The rotating circuit board 250 ensures complete range of movement of the camera-retaining body 105.

Figure 3B:
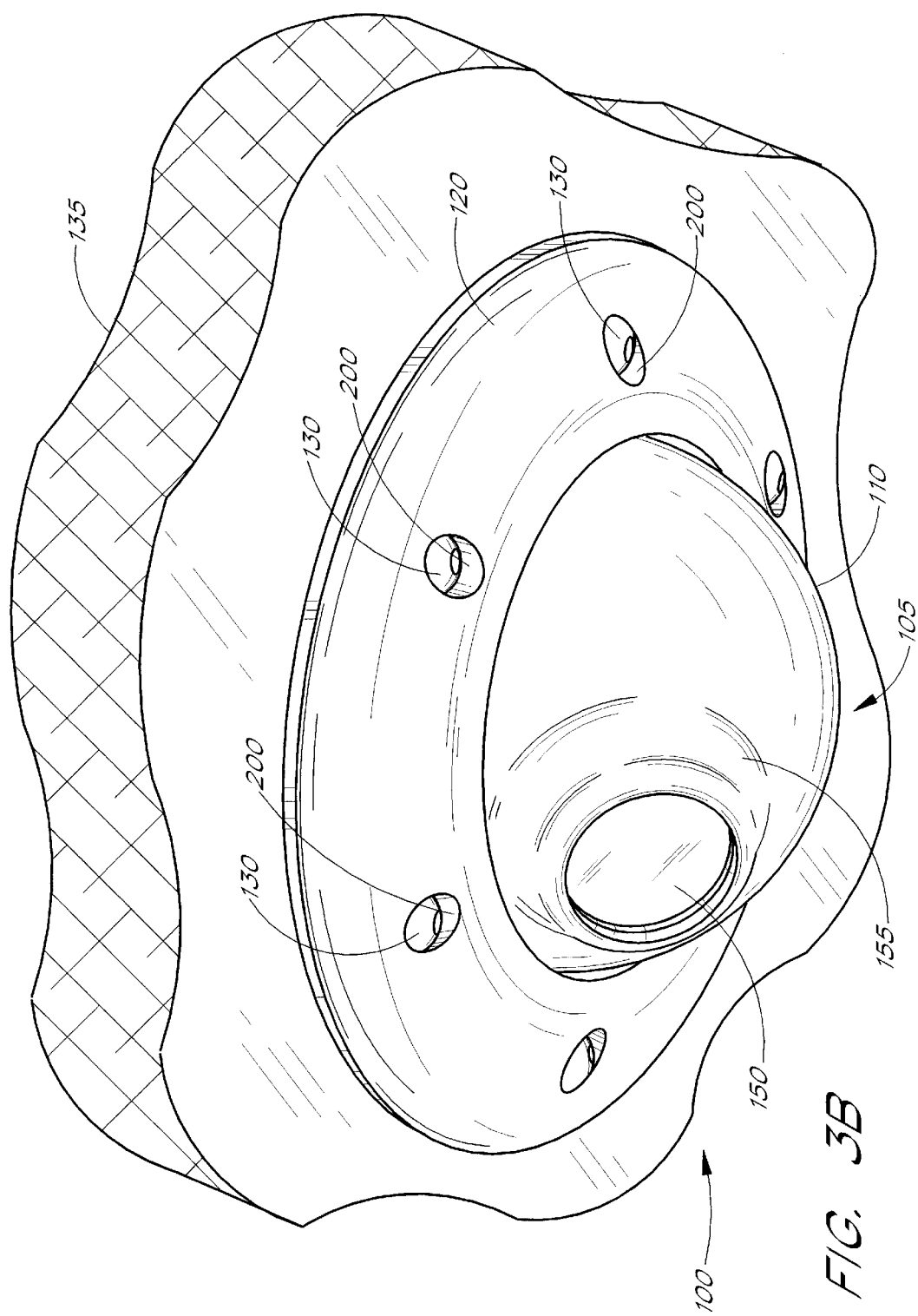
FIG. 3B illustrates a front view of the camera housing mounted within a surface according to the present invention.

FIG. 3B illustrates the flush mounting of the camera housing 100 according to the present invention. When the camera housing 100 is installed within the mounting surface 135, only the retaining ring 120 and the camera-retaining body 105 are visible. The fasteners 130 extend through the fastener apertures 200 to secure the retaining ring 120 to the mounting ring 125. The camera-retaining body 105 provides protection for the camera 170. This low-profile design allows the camera housing 100 to be placed within a variety of locations within an area.

The retaining ring 120, the camera-retaining body 105, and the mounting ring 125 may be coated using an anodized process. The anodizing process provides a surface coating to the camera housing 100. The surface coating permits the camera housing 100 to have a variety of colors and patterns. By using an anodizing process, the coating is resistant to scratching and other environmental hazards such as corrosion. The anodizing provides a durable colorized layer to the camera housing 100. Additionally, the coloration and pattern of the anodizing process may be specially selected to blend with the decor of a room. Therefore, the camera housing 100 may easily blend within the décor of a room to be more aesthetically pleasing, as well as increase the camouflage of the camera housing 100.

Figure 4:
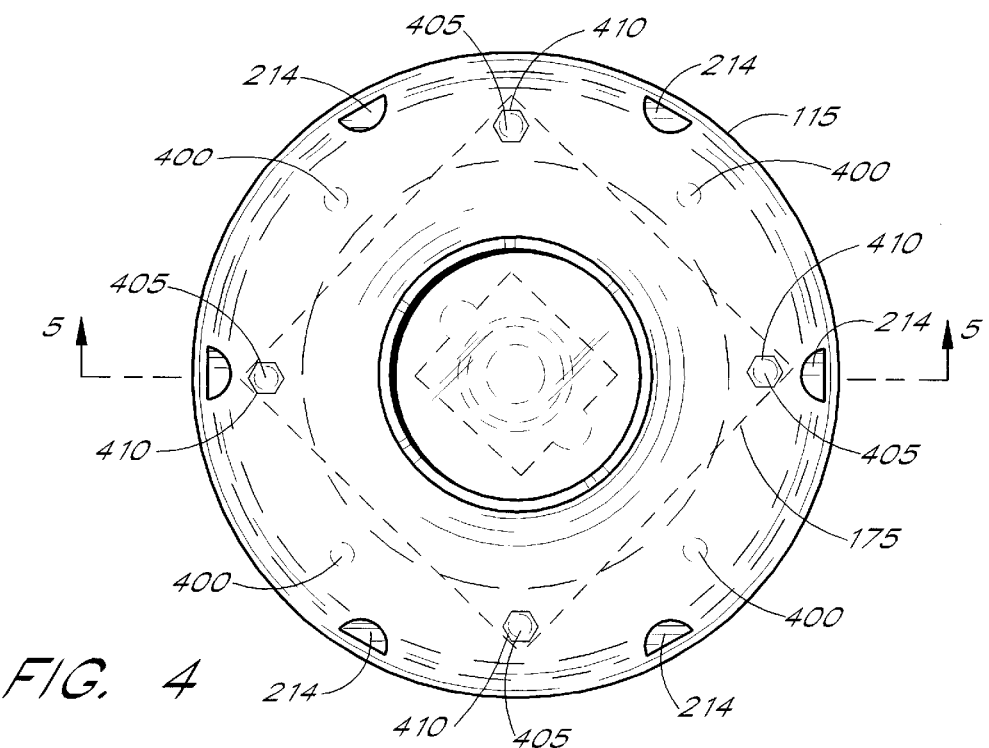
FIG. 4 is a plan view of the inside surface of one section of the camera-retaining body according to the present invention.

FIG. 4 illustrates a top view of the inside of the second section 115 of the camera-retaining body 105. The camera 170 may be secured within the second section 115 of the camera-retaining body 105. To secure the camera in place, and to provide a flexibility for multiple cameras and mounts, the second section 115 of the camera retaining body contains a plurality of adaptor apertures 400 and 405. The adaptor apertures 400 and 405 are located in positions throughout the bottom of the second section 115 so a variety of different camera mounts may be used. Standoffs or adaptors 410 may be inserted into each adaptor aperture 400 or 405 to provide a mounting base for the camera board 175. If different sized camera board 175 is needed, the standoffs or adaptors 410 may be moved among any of the adaptor apertures 400 or 405 as necessary. By using a combination of adaptor apertures 400 and 405 and different sizes and shapes of standoffs or adaptors 410, a wide variety of camera boards 175 and cameras 170 may be attached to the second section 115 of the camera-retaining body 105.

Figure 5:
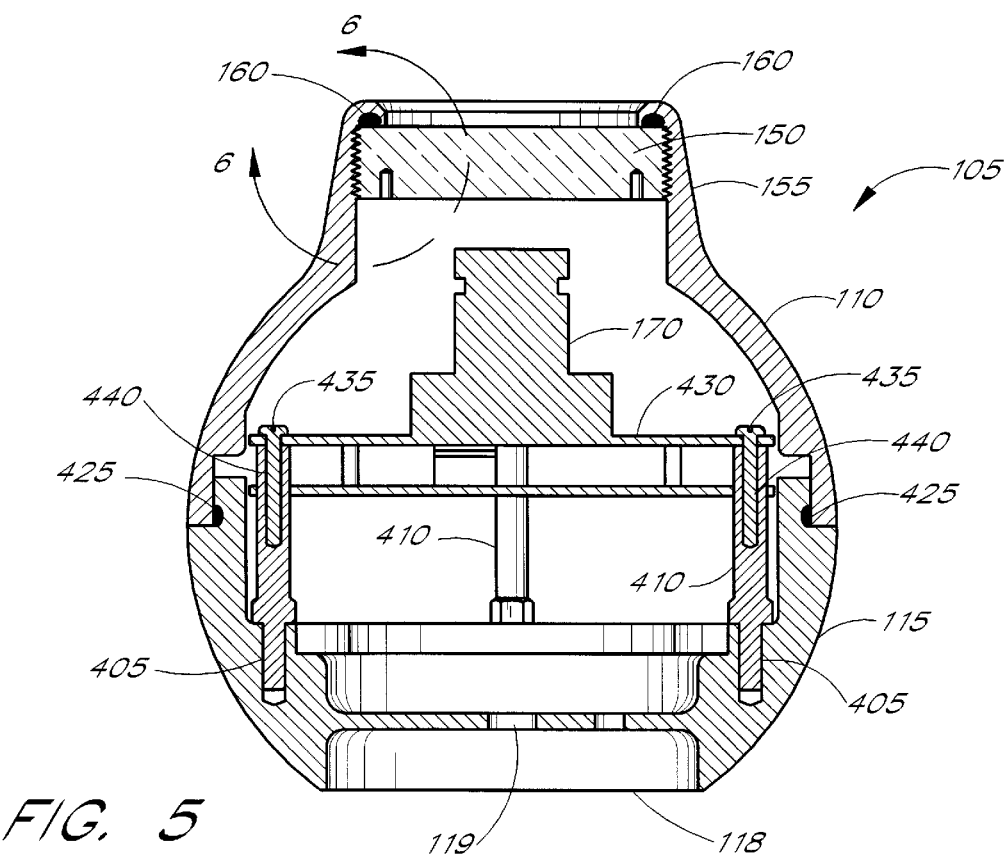
FIG. 5 is a cut-away view of the camera-retaining body according to the present invention.

FIG. 5 illustrates a plurality of the standoffs or adaptors 410 being used to connect a camera mounting board 430 to the second section 115 of the camera-retaining body 105. The standoffs or adaptors 410 are inserted into the adaptor apertures 405. In one embodiment, the adaptor apertures 400 and 405 are threaded and the standoff or adaptors 415 have matching threads to screw into the adaptor apertures 400 or 405. However, other methods of attachment into the adaptor apertures may be used without departing from the spirit of the invention. Once the appropriate number and size of standoffs or adaptors 410 are in place, the camera 170 on the camera board 430 is placed on the standoffs or adaptors 410. At this point, a plurality of fasteners 435 may be used to secure the camera mounting board 430 to the standoffs or adaptors 410. The standoffs or adaptors 410 may include threaded apertures in which to hold the plurality of fasteners 435.

FIG. 5 further shows the camera-retaining body 105 comprising the first section 110 connected to the second section 115. When the camera-retaining body is connected, a gasket 425 may be placed between the first section 110 and the second section 115. The gasket 425 provides a water-tight seal between the first section 110 and the second section 115. Each section 110 and 115 of the camera-retaining body 105 may include fine-pitched threads which allow the first section 110 and the second section 115 to screw together. The pressure created when the two sections are screwed together flattens the gasket 425 to create the water-tight seal. Of course, other methods of connecting the first section 110 to the second section 115 may be used and are well-known in the art.

Figure 6:
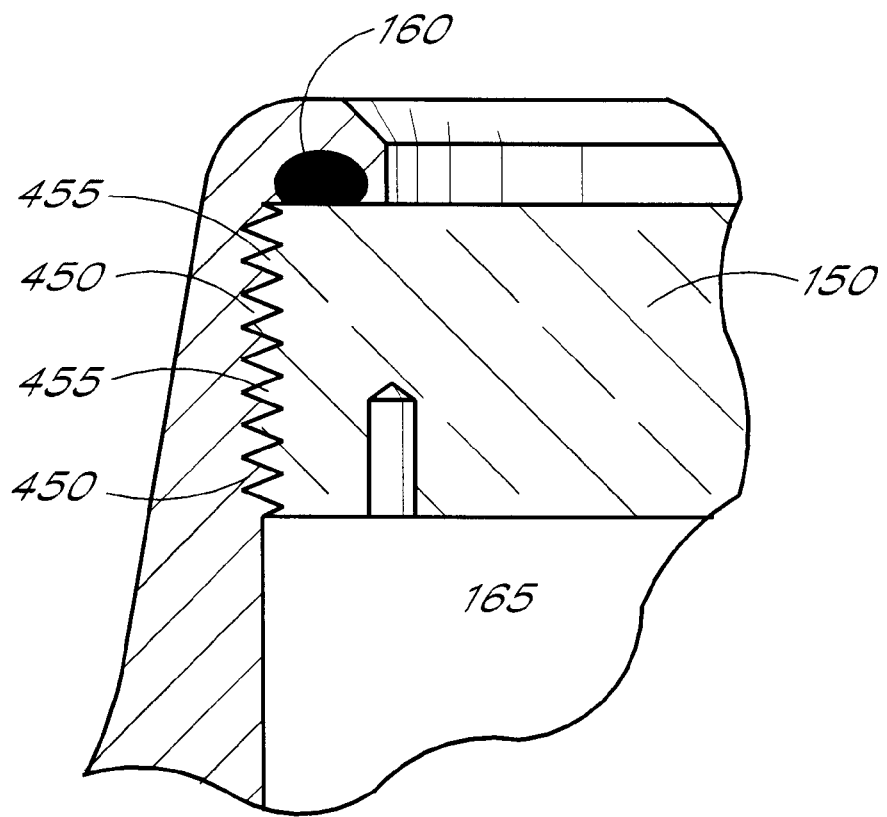
FIG. 6 illustrates an expanded view of a portion of the camera-retaining body according to FIG. 5.

Attachment of the lens cover 150 to the neck 155 of the first section 110 of the camera-retaining body 105 is seen in FIGS. 5 and 6. In one embodiment, the lens cover 150 contains a plurality of threads 455 which mate with a plurality of threads 450 within the neck 155 of the first section 110 of the camera-retaining body 105. The lens cover 150 includes the removal apertures 165 which are designed to hold prongs from a special attachment and removal tool (not shown). When the tool is inserted within the removal apertures 165, the lens cover 150 may be easily inserted into or removed from within the neck 155 of the camera-retaining body 105. As the lens cover 150 is tightened into the neck 155 of the camera-retaining body 105, the gasket 160 is compressed at the neck 155. The gasket 160 provides a water-tight seal between the lens cover 155 and the camera-retaining body 105.

Figure 7:
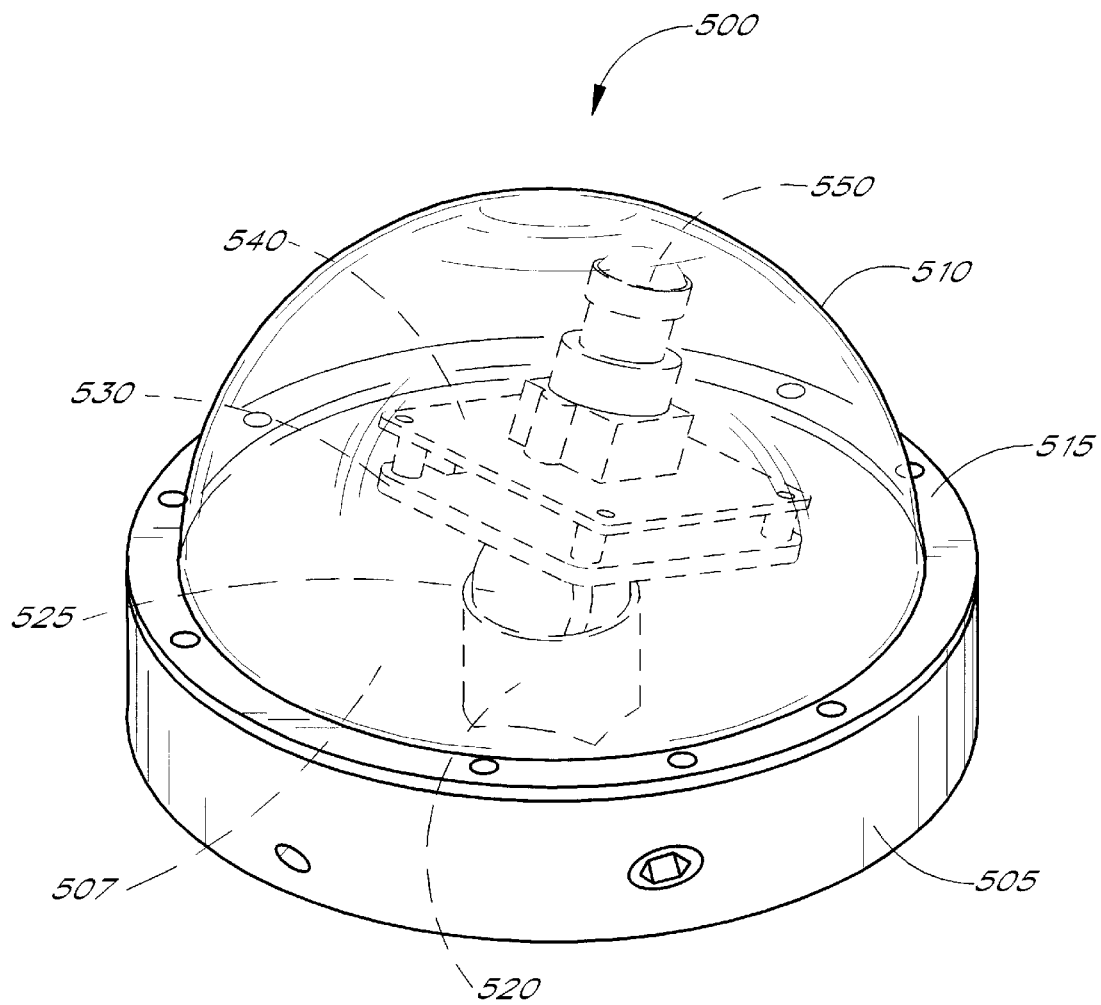
FIG. 7 is a perspective view of a camera housing according to another embodiment of the present invention.

A camera housing 500 according to another embodiment of the invention is illustrated in FIG. 7. The camera housing 500 comprises a base 505, a dome 510, a locking ring 515, a positioning stand 520, a ball mount 525, and a camera mounting stand 530. In one embodiment, the ball mount 525 and the camera mounting stand 530 comprises a single piece. The positioning stand 520 is secured to the floor 507 of the base 505. A camera 550 is mounted on a camera-mounting board 540 which connects to the camera-mounting stand 530. The camera-mounting stand 530 swivels about the ball mount 525 to move the camera over a specified range. When combined with the movement of the ball mount 525 and a plurality of mounting positions of the positioning stand 520, the camera 550 may move over a range of 360° of pan and 180° of tilt. The dome 510 provides for protection for the camera 550 in the camera housing 500.

Figure 8:
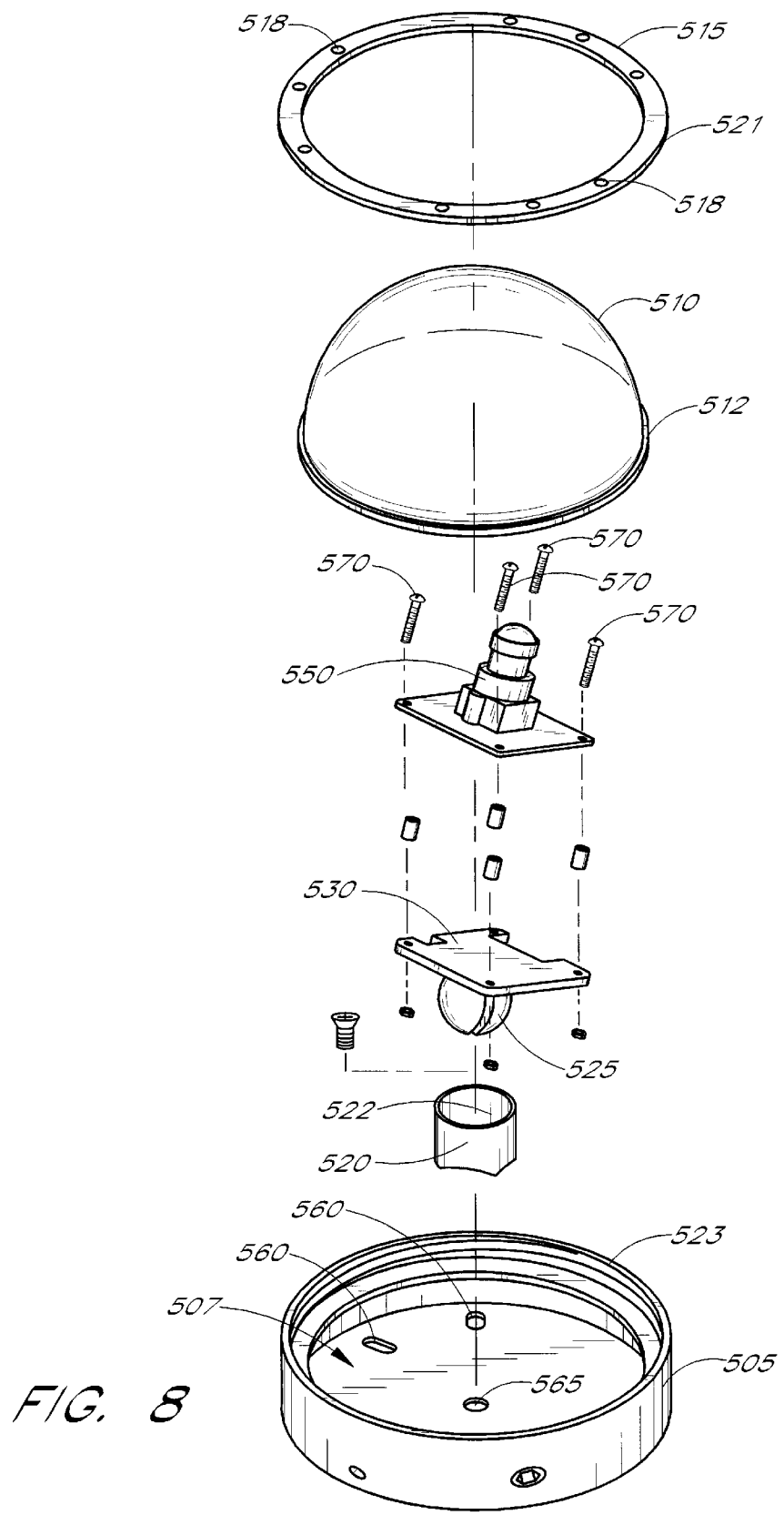
FIG. 8 is an exploded, perspective view of the camera housing according to FIG. 7.

Assembly of the camera housing 500 is seen in FIG. 8. The base 505 has a plurality of mounting apertures 560. The mounting apertures are designed to attach the base to a mounting surface. The base 505 may also be designed to fit within standard mounting boxes. A connection aperture 565 is also included in the floor 507 of the base 505. The connection aperture 565 provides a connection between the positioning stand 520 and the base 505. A fastener (not shown) attaches the positioning stand 520 through the connection aperture 565 to secure the positioning stand 520 to the base 505.

The ball mount 525 is designed to fit within an aperture 522 in the positioning stand 520. The ball mount 525 is an over center-type mount and the ball mount 525 may rotate within the positioning stand 520. The camera 550 and camera-mounting board 540 attaches to the camera-mounting stand 530 through a plurality of fasteners 570. The camera mounting stand 530 moves as the ball mount 525 rotates to position the camera 550 in a desired location.

After each of the positioning stand 520, the ball mount 525, the associated camera-mounting stand 530, and the camera 550 are secured to the base 505, the dome 510 is placed over the entire assembly onto the base 505. The dome 510 contains a dome lip 512 which runs along the periphery of the dome 510. The dome lip 512 fits on a ledge in the base 505. After the dome 510 is placed on the base 505, the locking ring 515 is placed over the dome 510 and secures the dome 510 to the base 505. The locking ring has threads 521 which are designed to interface with threads 523 in the base 505. By screwing the locking ring 515 into the base 505, the locking ring 515 provides a downward pressure on the dome lip 512 to hold the dome 510 in position. The locking ring 515 is provided with a plurality of apertures 518 which may be used in cooperation with a tool to tighten the locking ring 515. Alternatively, a plurality of raised grips may be used in place of apertures 518 to provide a grip for locking and unlocking the locking ring 515. A gasket (not shown) is positioned between the dome 510 and the base 505. As the locking ring 515 provides downward pressure on the dome lip 512, the gasket is compressed to provide a watertight seal between the dome 510 and the base 505.

Figure 9:
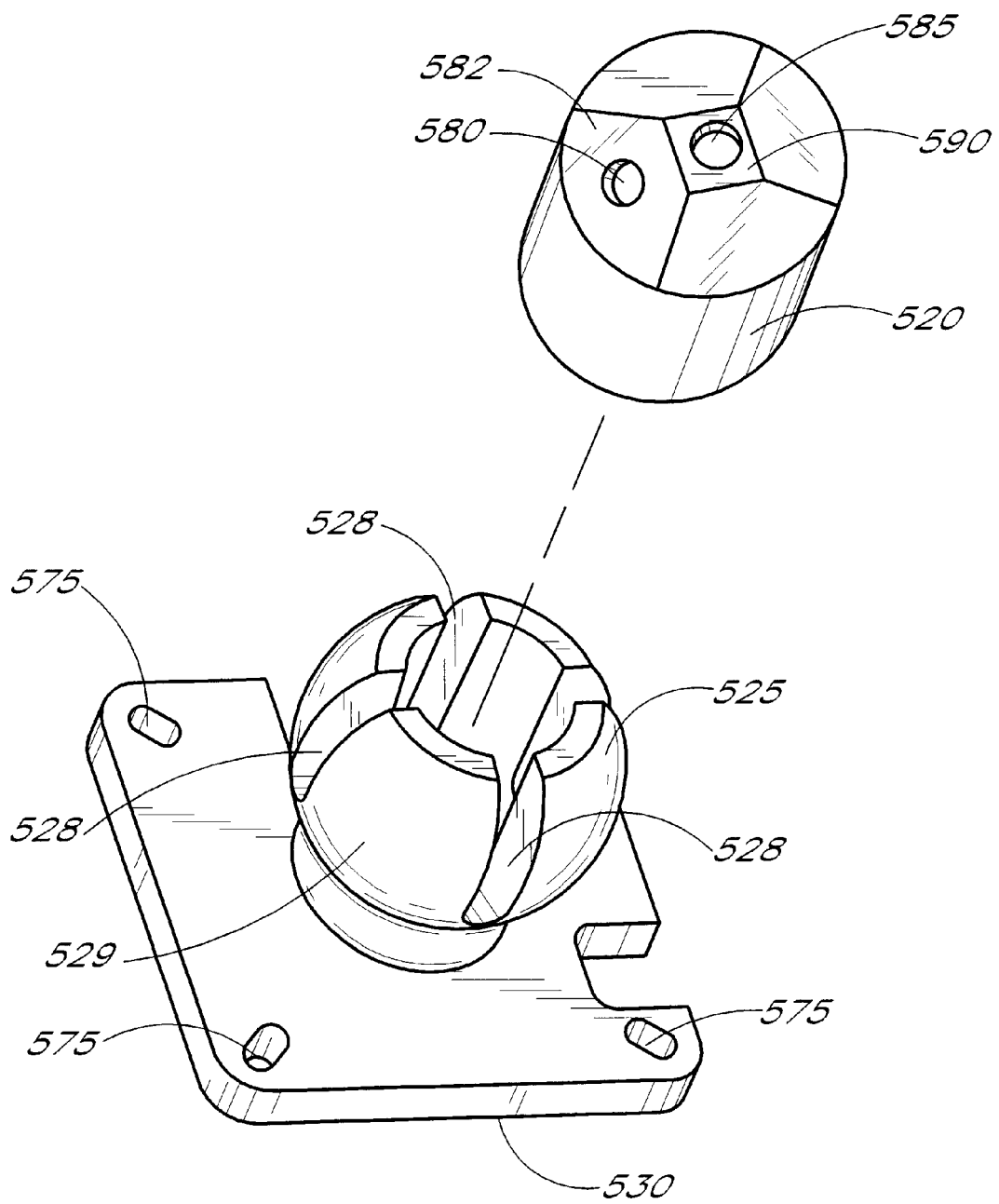
FIG. 9 is a perspective view of the camera mounting hardware of the camera housing of FIG. 7.

A perspective view of the bottom end of the positioning stand 520 and the ball mount 525 is seen in FIG. 9. The positioning stand 520 is in the shape of a chamfered cone. The chamfered shape provides for a plurality of mounting surfaces which may contact the base 505 of the camera housing 500. In one embodiment, a mounting aperture 580 is positioned within a mounting surface 590. When using the mounting surface 590, the positioning stand 520 extends at approximately 90° from the base 505. The positioning stand also includes a second mounting aperture 580 on a second mounting surface 582. The mounting surface 582 is provided at an angle from the mounting surface 590 so that when the mounting aperture 580 is used to connect the positioning stand 520 to the base 505, the positioning stand 520 extends at approximately 45° from the base 505. Of course, the mounting surface 582 may be at such an angle so the positioning stand 520 may be mounted to the base 505 at a variety of angles within the range of 15° to 60°, and preferably 30° to 45°. The combination of the mounting positions from the mounting surfaces 590 and the mounting surface 582 provides the camera position over a full range of 360° of pan and 180° of tilt. The camera mounting surface 582 also allows the camera to rotate about its axis.

The ball mount 525 has a plurality of cutaway sections 528 to create a plurality of wedge sections 529. The ball mount 525 is inserted into the positioning stand 520 so that the wedge sections 529 are slightly compressed. The friction between the wedge sections 529 and the positioning stand 520 secure the camera at a fixed location. However, by applying an amount of force to the ball mount 525, the position of the camera 550 may be manually rotated within the positioning stand 520. The camera mounting board 540 is attached to the camera mounting stand 530 through a plurality of connection apertures 575. The camera mounting stand 530 is secured to the camera mounting board 540 using a plurality of fasteners 570 as is known in the art.

Numerous variations and modifications of the invention will become readily apparent to those skilled in the art. Accordingly, the invention may be embodied in other specific forms without departing from its spirit or essential characteristics. The detailed embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A camera housing comprising:
   a first retaining ring;
   a second retaining ring positioned in coordination with the first retaining ring to create a gap between the first retaining ring and the second retaining ring; and
   a camera retaining body positioned between the first retaining ring and the second retaining ring, the camera retaining body being adapted to enclose a camera and being moveable over a range, wherein the camera retaining body may be locked in a set position by decreasing the gap between the first retaining ring and the second retaining ring.

2. The camera housing of claim 1, wherein the camera is moveable over a range of 360 degrees of pan and 90 degrees of tilt.

3. The camera housing of claim 1, wherein the camera retaining body is adapted to enclose a surveillance camera.

4. The camera housing of claim 1, wherein the body further comprises a plurality of standoffs adapted to mount to the camera.

5. The camera housing of claim 4, wherein the plurality of standoffs allow for mounting of cameras of differing sizes.

6. The camera housing of claim 1, wherein the first retaining ring mounts on a first side of a surface.

7. The camera housing of claim 6, further comprising at least one bolster plate which mounts on a second side of the surface, wherein the bolster plates increase the mounting strength of the first retaining ring.

8. The camera housing of claim 1, wherein the first retaining ring is connected to the second retaining ring with a plurality of fasteners.

9. The camera housing of claim 8, wherein the plurality of fasteners include anti-tampering features.

10. The camera housing of claim 9, wherein the plurality of fasteners are tork screws.

11. The camera housing of claim 8, wherein the gap between the first retaining ring and the second retaining ring is decreased by tightening the plurality of fasteners.

12. The camera housing of claim 1, wherein the camera retaining body has a generally spherical shape.

13. The camera housing of claim 12, wherein the camera retaining body comprises a first section and a second section which combine to form the generally spherical shape.

14. The camera housing of claim 13, wherein the first section and the second section of the camera retaining body are combined using threads to screw the sections together.

15. The camera housing of claim 12, wherein the first section of the camera retaining body has a neck.

16. The camera housing of claim 15, wherein the neck of the first section of the camera housing has a transparent, protective lens cover.

17. The camera housing of claim 16, wherein the lens cover is threaded.

18. The camera housing of claim 17, wherein the lens cover creates a watertight seal by screwing into the neck of the first section of the camera housing.

19. The camera housing of claim 17, wherein the lens cover has apertures which are adapted to cooperate with a tool to assist in tightening and removing the lens cover to the neck of the first section of the camera housing.

20. The camera housing of claim 17, wherein the lens cover is made of Lexan.

21. The camera housing of claim 1, wherein the camera retaining body protects the camera from external forces.

22. The camera housing of claim 1, wherein the camera housing is constructed of an aircraft grade aluminum.

23. The camera housing of claim 22, wherein the aircraft grade aluminum is Billet 2024 aluminum.

24. A camera housing comprising:
    a first mounting plate;
    a body having a first section and a second section, the body being adapted to enclose a camera;
    a second mounting plate which cooperates with the first mounting plate to secure the body recessed in a surface; and
    a connection board adapted to host connections for the camera, the connection board movably attached to the second section of the body and allowing for movement of camera connections, wherein the first and second section of the body screw together to form a generally spherical shape, and
    wherein the first section and the second section of the body have assembly grips to assist in screwing the sections.

25. A camera housing comprising:
    a first mounting plate;
    a body having a first section and a second section, the body being adapted to enclose a camera;
    a second mounting plate which cooperates with the first mounting plate to secure the body recessed in a surface; and
    a connection board adapted to host connections for the camera, the connection board movably attached to the second section of the body and allowing for movement of camera connections, wherein the body is anodized.

26. The camera housing of claim 25, wherein the anodizing changes the color of the body.

27. The camera housing of claim 26, wherein the color of the body blends into the surface.

28. A method of mounting a camera housing within a surface, the method comprising:
   securing a first retaining ring to the surface;
   positioning a camera retaining body on the first retaining ring; and
   locking the camera retaining body into position by tightening a second retaining ring to the first retaining, where the second retaining ring is connected to the first retaining ring using anti-tampering fasteners.

29. A method of mounting a camera housing within a surface, the method comprising:
   securing a first retaining ring to the surface;
   positioning a camera retaining body on the first retaining ring; and
   locking the camera retaining body into position by tightening a second retaining ring to the first retaining ring, wherein the camera retaining body comprises a first section having fine pitch threads and a second section having fine pitch threads, threads of the first and second section interfacing to screw together the camera retaining body.

30. A camera housing comprising:
   a base;
   a protective dome;
   a locking ring which fits over the protective dome and threads into the base, the locking ring securing the dome to the base;
   a positioning stand being adapted to mount to the base in either a first mounting position or a second mounting position; and
   a camera mounting stand adapted to receive a camera, the camera mounting stand being movably connected to the positioning stand such that the combination of the first mounting position and the second mounting position permits positioning of the camera mounting stand over a range of 360 degrees of pan and 180 degrees of tilt.

31. The camera housing of claim 30, wherein the dome comprises Lexan.

32. The camera housing of claim 30, wherein the base is adapted to mount in standard electrical construction boxes.

33. The camera housing of claim 30, where in the first mounting position the positioning stand mounts to the base on a first mounting surface and in the second mounting position the positioning stand mounts to the base on a second mounting surface.

34. The camera housing of claim 30, wherein the locking ring includes anti-tampering features.

* * * * *

UNITED STATES PATENT AND TRADEMARK OFFICE
CERTIFICATE OF CORRECTION

PATENT NO.     : 6,476,856 B1
DATED          : November 5, 2002
INVENTOR(S)    : Robert D. Zantos It is certified that error appears in the above-identified patent and that said Letters Patent is hereby corrected as shown below:

<u>Title page,</u>
Item [75], please correct inventor's name from "Robert L. Zantos" to
-- Robert D. Zantos --.

Signed and Sealed this

Twenty-fifth Day of November, 2003

JAMES E. ROGAN
*Director of the United States Patent and Trademark Office*